April 14, 1931.                G. E. NERNEY                1,800,263
                         EYEGLASS CONSTRUCTION
                         Filed Sept. 14, 1927

George E. Nerney INVENTOR
BY Robert L. Blair ATTORNEY

Patented Apr. 14, 1931

1,800,263

UNITED STATES PATENT OFFICE

GEORGE E. NERNEY, OF ATTLEBORO, MASSACHUSETTS, ASSIGNOR TO BAY STATE OPTICAL COMPANY, OF ATTLEBORO, MASSACHUSETTS, A CORPORATION OF MAINE

EYEGLASS CONSTRUCTION

Application filed September 14, 1927. Serial No. 219,410.

This invention relates to eyeglass construction and more particularly to eyeglass frames or lens mountings.

One of the objects of the invention is to provide a lens mounting which is practical and efficient. Another object is to provide a strong and serviceable construction of the above nature in which the lenses are held in position relative to each other by a spring bridge which serves also to urge nose gripping parts against the sides of the nose. Another object is to provide a construction of the above nature which is simple and convenient to manufacture. Another object is to provide a construction of the above nature which is neat and attractive in appearance. Another object is to provide an eyeglass frame having split rims, to permit insertion or removal of the lenses, which are connected in an efficient and inconspicuous manner. Other objects will be in part obvious or in part pointed out hereinafter.

This application is a continuation in part of my application filed April 9, 1927, Serial No. 182,196.

The invention accordingly consists in the features of construction, combinations of elements, and arrangements of parts as will be exemplified in the structure to be hereinafter described and the scope of the application of which will be indicated in the following claims.

In the accompanying drawing in which is shown one of the various possible embodiments of the invention, Figure 1 is a front elevation;

Similar reference characters refer to similar parts throughout the several views of the drawing.

Figure 1:
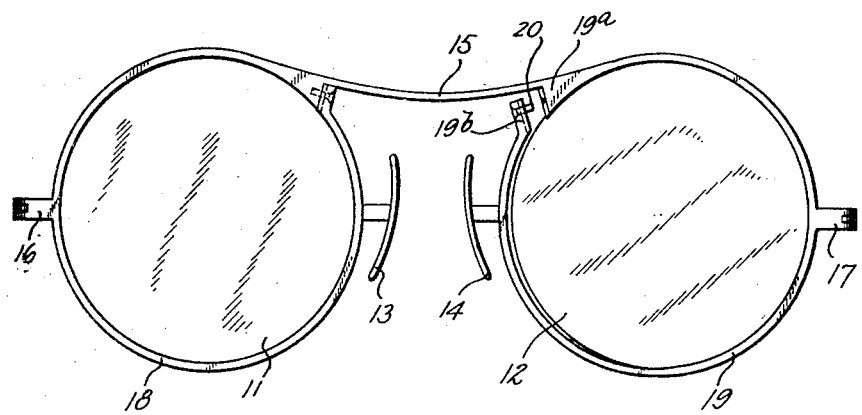

Referring now to the drawing in detail, there are shown in Figure 1 a pair of lenses 11 and 12 equipped with a mounting, or supported in a frame, which includes nose pieces 13 and 14, a connecting bridge 15 and projecting parts 16 and 17 at either side for making connection with temple bars. In this particular construction, it will be understood, the weight of the eyeglasses is carried upon the sides of the nose by the nose pieces 13 and 14, and temple bars attached to the lugs 16 and 17 aid in holding the eyeglasses against slipping forwardly out of position upon the wearer. It is to be understood that the nose pieces or nose-engaging parts 13 and 14 may take various forms, and also that the temple bars may be dispensed with, in which case the eyeglasses are held in position solely by the grip of the nose pieces 13 and 14 against the sides of the nose.

As shown herein, the lenses 11 and 12 rest in rims 18 and 19 which encircle the edges of the respective lenses. The connecting bridge 15 is joined at its ends to the rims 18 and 19. This bridge 15 is resilient and preferably takes the form of a flat metal spring member. When the eyeglasses are in position upon the wearer the spring bridge 15 urges the lenses toward each other and holds the nose pieces 13 and 14 firmly in against the sides of the nose.

As is clear from Figure 1 of the drawing, the spring bridge 15 shown herein curves downwardly at its middle portion, its two ends curving upwardly where they join the rims 18 and 19 and merging into the rims at upper portions thereof which are also curving upwardly. In its normal free position, the bridge has a downward curvature substantially as shown in Figure 1 of the drawing. The eyeglasses are placed in position upon the wearer by moving the lenses apart to increase or widen the distance between the nose pieces 13 and 14 and permit their being placed into position over the nose and against the side surfaces thereof. This spreading or moving apart of the lenses to place the eyeglasses in position effects a bending or flexing of the spring bridge 15 which increases its normal downward curvature, the ends of the bridge moving upwardly with respect to the middle portion thereof.

Figure 2:
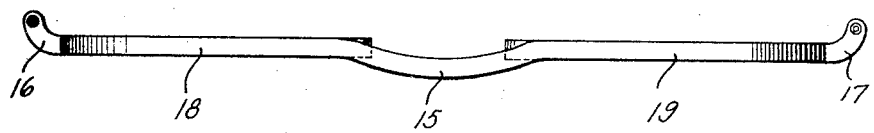
Figure 2 is a top plan view.

The concave or downwardly curving shape of the spring bridge 15 results in the bridge having a short span and makes for a very neat appearance. The shortness of the span also results in maximum strength. Aside from the length of the span and its appearance, however, the downwardly curving shape of bridge herein disclosed achieves mechanical advantages of dominant practical value. As has been pointed out above, when the bridge is flexed to widen the distance between the nose pieces, the curvature of the bridge is increased, the ends thereof moving upwardly with respect to the middle portion. The upwardly curving end portions of the bridge move upwardly with the upwardly curving rim portions to which they are attached. There is substantially no tendency toward straining or breaking of the bridge or rims at the points of connection between these two parts, this being in sharp contrast to the severe strain and "pulling away" tendency encountered, for example, in eyeglass frames of this general type wherein the bridge curves or arches upwardly at the middle. Moreover, this bridge 15 in having its downward curvature increased rather than being straightened out, as the nose pieces are separated, flexes easily with smooth and uniform action. As is seen in Figure 2, the bridge 15 herein preferably curves outwardly or forwardly in addition to its downward curvature.

The rims 18 and 19 which are shown herein are split or separated to permit insertion or removal of the lenses. In Figure 1 the two ends of the rim 18 are shown drawn together, clamping the periphery of the lenses 11, while the two ends of the rim 19 are shown separated so that the lens 12 is released for removal. Each of the rims is split adjacent the junction of the bridge 15 therewith and the ends come together underneath the bridge or between the bridge and the nose piece. Considering the rim 19, it is thickened in a radial direction or "filled in" at 19a, beneath the end portion of the bridge 15; the end portion of the rim adjacent to the nose piece 14 is provided with an outwardly or upwardly bent part 19b which is adapted to come against the face of the part 19a. A screw 20 is provided for detachably securing the two rim ends together; this screw passes through the part 19b and threads into the part 19a in a direction away from the other rim, the head of the screw facing inwardly toward the other rim.

Figure 3:
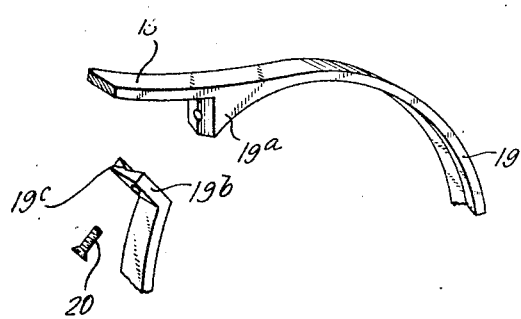
Figure 3 is a perspective view showing in enlarged detail a portion of the construction shown in the preceding figures.

Preferably the abutting faces of the parts 19a and 19b are made to interfit as is more clearly seen in Figure 3, the face on the part 19a being convex, having a central ridge extending substantially in the plane of the rim, and the part 19b having a concave face formed by a groove which is adapted to mate with the ridge of the part 19a. These surfaces thus interfitting serve to laterally aline the two rim ends when they are drawn together by the screw and they also greatly strengthen the resulting connection. In addition, the top edge 19c of the part 19b preferably comes up against the bottom surface of the bridge 15 thereby further strengthening the connection. The positioning as above described of the break or split of the rims makes for strength and durability of the entire eyeglass frame. The connection is made at a point where it is required to withstand very little strain and where it is also inconspicuous, blending naturally into the general contour of the frame. The heads of the screws 20 are preferably countersunk and, facing as they do, they are almost entirely unnoticeable.

As many possible embodiments may be made of the above invention and as many changes might be made in the embodiment above set forth, it is to be understood that all matter hereinbefore set forth or shown in the accompanying drawing is to be interpreted as illustrative and not in a limiting sense.

I claim as my invention:

1. In eyeglass construction, in combination with a pair of lenses, a pair of nose pieces for engaging the sides of the nose and connected respectively to the lenses, and a resilient bridge for connecting the lenses together and for urging the lenses toward each other to hold said nose pieces in against the sides of the nose, said bridge having normally a downward curvature at its middle portion and meeting said lenses along substantially tangential lines, and said downward curvature being increased when the bridge is flexed so as to move the lenses apart to widen the normal distance between said nose pieces and permit placing of said nose pieces in position against the sides of the nose.

2. In eyeglass construction, in combination, a pair of rim members, a pair of nose members adapted to engage the sides of the nose and positioned respectively upon said rim members, and a downwardly arching resilient bridge for connecting said rim members together and for urging said rim members toward each other to hold said nose members in against the sides of the nose, the ends of said bridge joining said rim members at points thereon above said nose members, said resilient bridge being flexed to increase said downward arching when the rims are moved apart to widen the distance between said nose pieces.

3. In eyeglass construction, in combination, a pair of rim members, a pair of nose members adapted to engage the sides of the nose and positioned respectively upon said rim members, a bridge for connecting said two rim members together and for urging them toward each other to hold said nose members in against the sides of the nose, said bridge comprising a flat metal spring the ends of which are rigidly secured along substantially tangential lines to said respective rim members at upwardly curving portions thereof above said nose pieces, said spring bridge being shaped so that in its normal free position it arches downwardly intermediate its two ends, said arching being increased when said rim members are moved apart to widen the distance between them.

4. In eyeglass construction, in combination, a pair of rims each having thereon at a portion thereof adjacent to the other a means adapted to engage a side of the nose, a downwardly arching bridge for connecting said rims and permanently joined at its ends to said respective rims at portions thereof above said nose-engaging means, each of said rims being split and the ends thereof being detachably connected together adjacent the junction of said bridge therewith and on the side of said junction nearest said nose-engaging means.

5. In eyeglass construction, in combination, a rim, a bridge connected at one end to an upper portion of said rim and extending downwardly and outwardly therefrom in a generally lateral direction, said rim being split at a point closely adjacent to and beneath said bridge, and securing means closely adjacent to and beneath said bridge for detachably connecting the rim ends together.

6. In eyeglass construction, in combination, a pair of rims, a downwardly arching bridge for connecting said rims and joined at its ends to said respective rims at upper portions thereof, each of said rims being split adjacent to the junction of said bridge therewith, and a screw for each of said rims detachably joining together the ends thereof adjacent the bridge, the head of said screw being positioned beneath the bridge and the screw entering the rim in a direction away from the other rim.

7. In eyeglass construction, in combination, a pair of rims, a bridge comprising a metal spring for connecting said rims and joined thereto at upper portions thereof, said bridge having a downward curvature intermediate its ends, said rims being split at points adjacent to and beneath the end portions of said downwardly curving bridge, and screws for drawing the ends of said rims together.

8. In eyeglass construction, in combination, a split rim, a bridge connected to said rim adjacent one of the ends thereof, the other end of said rim having an outwardly projecting part the outer end of which rests against the under surface of said bridge, and means for drawing said two rims ends together.

9. In eyeglass construction, in combination, a split rim, a bridge connected to said rim adjacent one of the ends thereof, said rim having a thickened portion forming an abutment angularly disposed with respect to said rim and said bridge and extending downwardly beneath said bridge, the other end of said rim having a surface abutting said abutment, and means for drawing said two ends together.

In testimony whereof, I have signed my name to this specification this 31st day of August, 1927.

GEORGE E. NERNEY.